PLASTIC GAUGE MOVEMENT

Original Filed Nov. 6, 1968 2 Sheets-Sheet 1

INVENTORS
PHILIP W. HARLAND
RALPH D. WAITE
BY
Fry Ulm & Moore
ATTORNEYS

PLASTIC GAUGE MOVEMENT

Original Filed Nov. 6, 1968 2 Sheets-Sheet 2

INVENTORS
PHILIP W. HARLAND
RALPH D. WAITE
BY
Smith & Moore
ATTORNEYS

United States Patent Office

Re. 28,181
Reissued Oct. 1, 1974

28,181
PLASTIC GAUGE MOVEMENT

Philip W. Harland, Perkasie, and Ralph D. Waite, Sellersville, Pa., assignors to Amtek, Inc., New York, N.Y.

Original No. 3,530,720, dated Sept. 29, 1970, Ser. No. 773,856, Nov. 6, 1968. Application for reissue Jan. 4, 1972, Ser. No. 215,442
Int. Cl. G01l 7/04
U.S. Cl. 73—415 10 Claims

Matter enclosed in heavy brackets [ ] appears in the original patent but forms no part of this reissue specification; matter printed in italics indicates the additions made by reissue.

ABSTRACT OF THE DISCLOSURE

A movement for a pressure gauge wherein a pinion carrying a hairspring and meshing with a sector gear mounted on an arbor are all mounted between top and bottom plates. The plates, pinion and sector gear are made of a plastic material. A bendable tail is made of metal and is mounted on the arbor and connectable to the pressure sensitive element of the gauge. The tail may be bent to calibrate the gauge. A zero stop for the pointer comprises a post on the top plate which passes through an opening in the dial face.

The present invention relates to a movement for a pressure gauge and, more particularly, to the compact arrangement of the components of the movement which may be formed from a plastic material.

The conventional pressure gauge comprises a pointer which moves over a dial face with the pointer being actuated by a mechanism in response to the pressure being measured. A pressure responsive element, such as a Bourdon tube, transmits its motion to the pointer through an arrangement of components which is termed a movement. Such a movement generally includes a pair of spaced plates with various types of gears, springs and shafts operatively mounted therebetween. The plates are spaced by short columns whose ends are suitably fastened to the respective plates. While the mechanism of such a movement is relatively simple, the number of components which must be assembled to complete the movement considerably complicates the assembly process. Even when the operative components are reduced to a minimum, various gears must still be mounted on shafts and each column must be connected at both ends to the respective plates.

One of the objects of the invention is to provide improved movement for a pressure gauge.

Another of the objects of the invention is to provide a movement for a pressure gauge wherein most of the components are of a plastic material.

A still further object of the invention is to provide a movement for a pressure gauge which comprises a minimum of parts which can be readily assembled into an operative movement.

In one aspect of the present invention, the movement may comprise top and bottom plates held in spaced relationship by telescoping columns, the telescoping portions of which are integrally formed on the respective plates. A shaft carrying a pinion is pivotally mounted between the plates and there is a hair spring having the inner end attached to the pinion shaft and the outer end trapped between telescoping projections emanating from the top and bottom plates. A sector gear is mounted on an arbor which is pivotally supported between the plates, and meshes with the pinion. An adjustable tail of a bendable sheet metal can be mounted on and keyed to the arbor, the tail being connectable to the pressure responsive element of the gauge. The tail is bendable to permit adjusting the range of the gauge. An extension of the bendable tail is arranged to contact the sector so as to limit the arc through which the sector can be rotated. This will limit the motion of the pressure sensitive element at some maximum pressure without loading the keyed joint between the tail and arbor. The plates, columns, pinion, pinion shaft and sector are of a plastic material.

Other objects, advantages and features of the present invention will become apparent upon reference to the accompanying description when taken in conjunction with the drawings, which are exemplary in the drawings.

Figure 1:
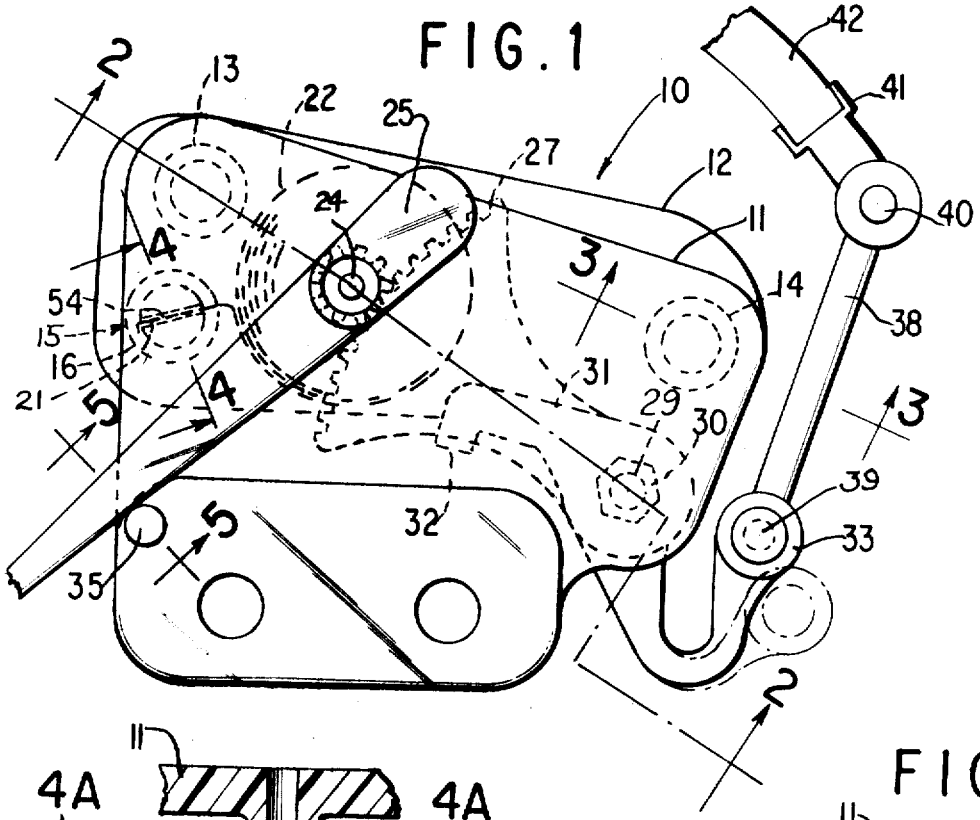
FIG. 1 is a front plan view of the movement according to the present invention.
Figure 3:
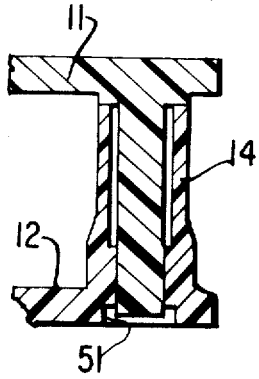
FIG. 3 is a sectional view taken along the line 3—3 of FIG. 1.

The movement according to the present invention is illustrated in one form in FIG. 1 and is indicated generally at 10. The movement comprises a top plate 11 and a bottom plate 12 which are interconnected in spaced relationship by a plurality of mating integral male and female telescoping columns 13, 14 and 15. Columns 13 and 41 are illustrated in section in FIGS. 2 and 3 respectively and are similar in construction.

Column 13 comprises a column portion 13a which is in the form of a tubular post on the inner face of bottom plate 12. Telescopingly received within column portion 13a is a second column portion 13b (FIG. 2) in the form of a solid post and extended from the inner face of top plate 11. A recess 51 (FIG. 3) may be provided at the base of column 13a to facilitate the application of cement so as to permanently join the two plates if desired.

Figure 4:
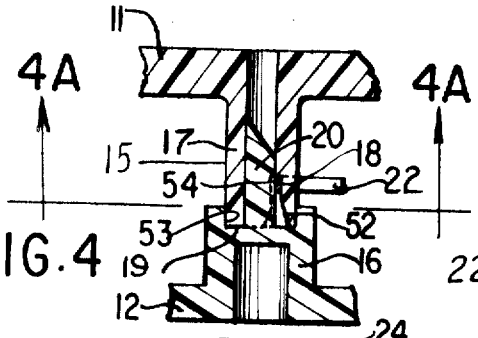
FIG. 4 is a sectional view taken along the line 4—4 of FIG. 1 and showing the attachment of the hair spring to a column.
Figure 4A:
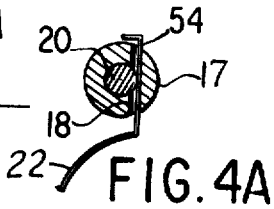
FIG. 4A is a section taken along the line 4A—4A of FIG. 4.

The column 15 (FIG. 4) is somewhat different in construction in that it comprises a first column part 16 which is mounted on bottom plate 12. Cooperating with column portion 16 is a hollow column portion 17 extending from top plate 11 and having a slot 18 in its end 19. There is a pin 20 formed on the inner end of column portion 16 which is received within the column 17. This slot 18 receives one end 21 of a hair spring 22. The slot is positioned off center of the hole in column portion 17 and has a tapered section 52 to act as a lead in to the hairspring slot. The dimensions and location of the slot are so arranged that when the projection 20 enters the hole in column portion 17 the clearance between the outer side of the slot 18 and the OD of the projection 20 is slightly greater than the thickness of the hairspring, typically .003 inch, thus providing a narrow passage to contain the hairspring. Column portion 17 is further provided with a recessed portion 53 which when the two plates are assembled surrounds the column 15 to a depth which is less than the depth of the slot 18 by an amount equal to the width of the hairspring, typically .025 inch. Thus when the outer end of the hairspring, which has been provided with a short 90° bend 54, is assembled into slot 18 and the two plates assembled the hairspring will be trapped both axially and radially without any distortion of the hairspring. No staking or other joining operations are needed to complete the assembly of the hairspring in the movement.

Figure 2:
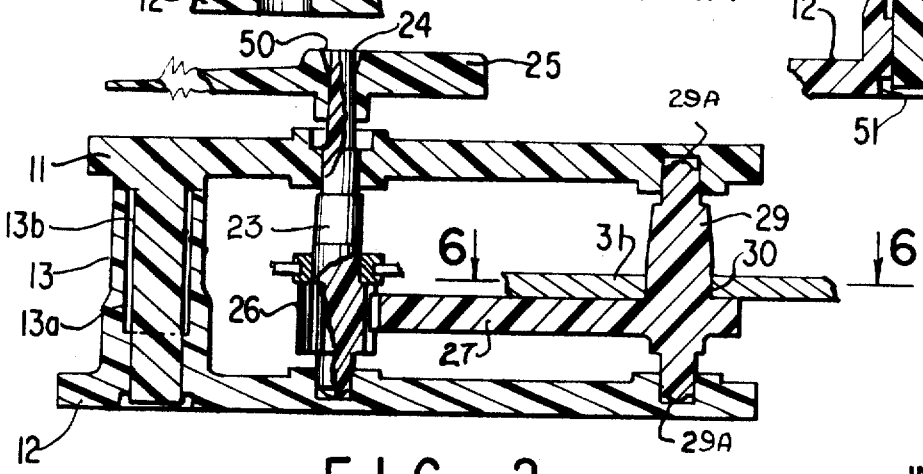
FIG. 2 is a sectional view taken along the line 2—2 of FIG. 1.
Figure 5:
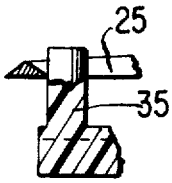
FIG. 5 is a sectional view taken along the line 5—5 of FIG. 1 and showing the pointer against the zero stop pin.
Figure 6:
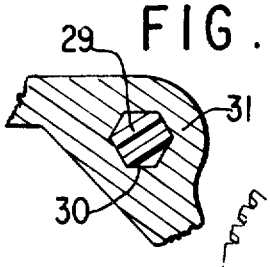
FIG. 6 is a sectional view taken along the line 6—6 of FIG. 2 and showing the cross section of the arbor carrying the segment.

The pinion shaft 23 journalled between the top and bottom plates is shown in FIG. 2. One end of pinion shaft 23 extends above top plate 11 and is indicated at 24. A pointer 25 is mounted on this end of the pinion shaft. The pointer may be molded of plastic such as black acetal resin with 30% glass fibers, or it may be formed from metal which is secured to a plastic bushing. The pointer may be provided with a recess 50 to facilitate application of cement so as to permanently fix the pointer to the pinion if desired.

A pinion gear 26 is integrally formed on pinion shaft 23 with the pinion and shaft arrangement being formed from an acetal resin.

The pinion gear 26 is engaged by a sector gear *numbered* 27 *and 28 in the drawings* having an *integrally* formed arbor 29 journalled between the top and bottom plates as illustrated in FIG. 2. The sector gear and arbor are formed of a plastic which may consist of 55% polycarbonate, 30% glass fibers and 15% polytetrafluoroethylene (TFE), or a similar composition using nylon in place of the polycarbonate.

The lower journal of the pinion and the two journals of the arbor are constructed to provide a controlled amount of axial clearance with a minimum of friction. This is accomplished by forming blind holes in the movement plates in which the journals operate and by providing the ends of the journals with a small projection 29A, having an essentially spherical contour. These projections operate against the flat bottom of the holes on the movement plates. The frictional forces are thus applied at a very small radius compared to conventional means of controlling axial clearance which is to provide a shoulder having a diameter which is necessarily larger than the journal. Because the frictional radius is small the torque created by the friction is a lower value than conventional movements.

Figure 7:
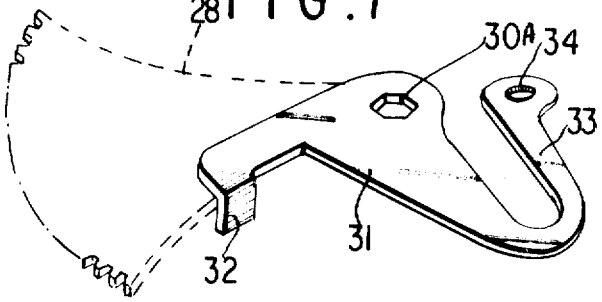
FIG. 7 is an overall perspective view of the tail with the sector gear being indicated in phantom lines.
Figure 10:
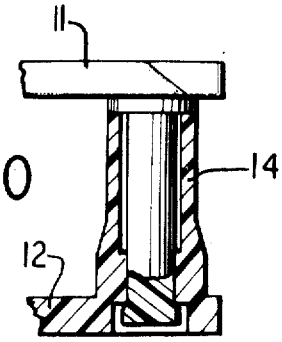
FIG. 10 is similar to FIG. 3 except an alternate arrangement is showing.
Figure 8:
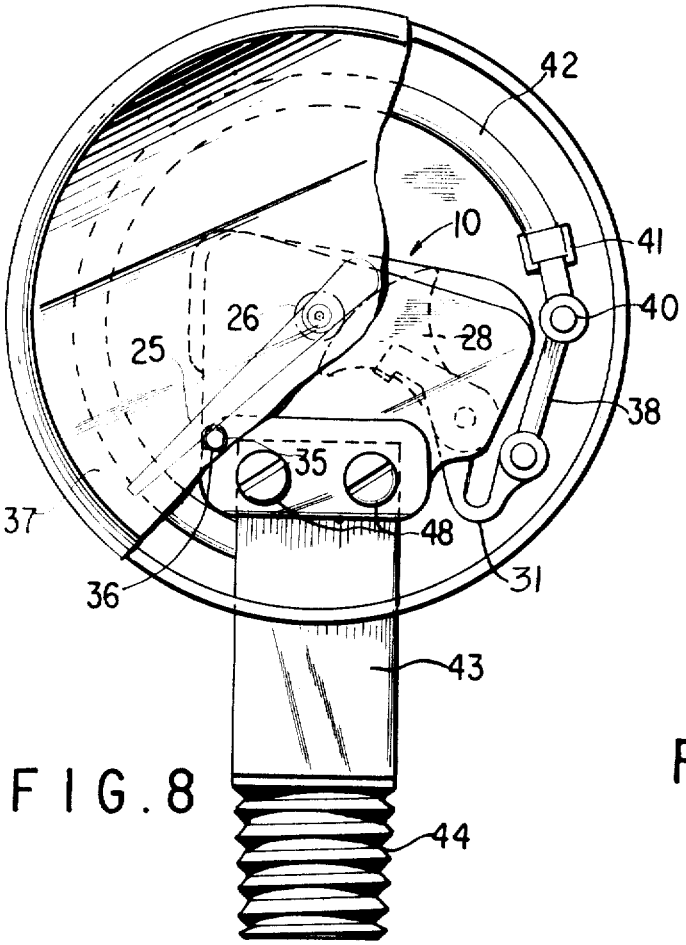
FIG. 8 is a front plan view of a pressure gauge incorporating the movement of the present invention with a portion of the dial face being cut away to illustrate the movement.
Figure 9:
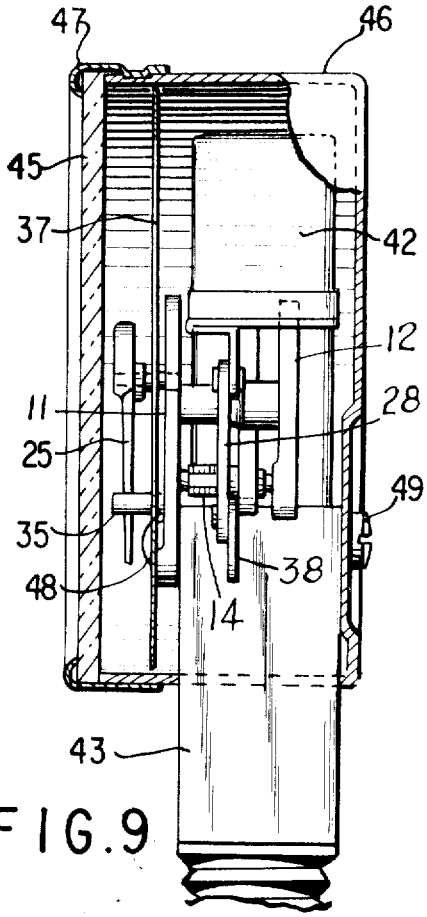
FIG. 9 is a side view of the gauge and movement of FIG. 8 with the casing being in section to illustrate the movement.

A short portion of the arbor immediately above the segment has a hexagonal cross section 30 (FIG. 1), so as to be closely received in a correspondingly shaped opening 30A in a bendable tail plate 31 (FIG. 7). The tail plate 31 is formed of a brass sheet material and one end is bent *rearwardly* at 32 *viewing FIG. 8* to engage an edge of the sector. The other *bendable* end is curved upward at 33 (FIG. 7) and is provided with an opening 34. The tail plate may be adjusted by bending *from the full to the dotted line positions of* [as illustrated by the dotted lines in] FIG. 1. Adjusting the tail plate in this manner varies the range of the gauge and is used to calibrate the pointer with the dial face scale markings.

Integrally formed on the upper face of top plate 11 is a pointer stop post 35 (FIG. 8) against which the pointer rests when no pressure is applied to the gauge. The post 35 passes through an opening 36 formed in the dial face 37 of the pressure gauge. By locating the pointer stop post on the top face in this manner the fabrication of the dial face is simplified.

The movement as described above is operatively connected to the pressure responsive element of the gauge by means of a link 38 connected to the tail 33 by rivet 39. The other end of link 38 is similarly connected by means of rivet 40 to tip 41 positioned on the outer end of a curved flattened tube 42 which is the pressure responsive element of the gauge. The other end of tube 42 is mounted in a socket 43 which may be formed of brass and is provided with external threads 44 on its outer end. While not shown in the drawing, there is a bore within socket 43 and communicating with the inner end of the flattened tube 42.

The dial face 37 is covered by a glass 45 held in place on the case 46 by a ring 47.

The connecting link 38 and the rivets on both ends thereof may be formed of brass. The top and bottom plates with their integral column portions may be formed of a plastic having the composition 55% polycarbonate, 30% glass fiber and 15% TFE, or a similar composition using nylon in place of polycarbonate.

The dial face may be secured to the top plate and upper end of the socket by means of screws 48. The rear face of case 46 is secured to the rear face of the socket by means of screws 49.

The hair spring may be formed of metal.

It can be seen that the present invention has provided a movement for a pressure gauge which consists of a minimum number of parts so as to facilitate assembly. By combining some of the components such as an integral plate and pointer stop and integral segment and arbor the number of components is reduced and assembly facilitated. In addition, the columns for securing and spacing the top and bottom plates of the movement have portions formed integrally with the respective plates with these portions fitting together in telescoping arrangement when the top and bottom plates are correctly positioned. The minimum number of parts not only facilitates assembly but significantly reduces the maintenance required to obtain accurate measurements with the pressure gauge as it has been found by tests that the plastic compositions used are greatly superior in wear resistance compared to the metal normally used in such movements.

It will be understood that various details of construction and arrangements of parts can be changed without departing from the spirit of the invention, except as defined in the appended claims.

What is claimed is:

1. In a movement for a pressure gauge *including a pressure responsive element*, a top plate of plastic material and a bottom plate of plastic material spaced therefrom with said plates carrying [a plurality of mating integral male and female plastic telescoping] columns *having aligned and cooperating surfaces* for *removably* interconnecting said plates *into a unitary structure*, a plastic shaft pivotally mounted between said plates and carrying a plastic pinion thereon, a pointer on the upper end of said pinion shaft, a metal hairspring having one end attached to said pinion shaft and the other end [trapped by one of said telescoping male and female columns,] *attached to said unitary structure*, a plastic sector gear integrally formed on and supported by a plastic arbor pivotally mounted between said plates and spaced from and meshing with said pinion, and a bendably adjustable metal tail plate [mounted] *apertured between two ends thereof and sleeved* on said arbor for movement therewith and *connected to said pressure responsive element* for calibrating said pointer.

[2. In a movement as claimed in claim 1 wherein said pointer is of a plastic material and said adjustable tail plate being of a bendable sheet metal.]

3. In a movement as claimed in claim [2] *1* with said plastic material comprising 55% nylon, 30% glass fibers, and 15% polytetrafluoroethylene.

4. In a movement as claimed in claim 1 with there being an integrally formed plastic stop post on said top plate and engageable by said pointer when in the zero position.

5. In a movement as claimed in claim 1 with *said plastic* [there being an] arbor pivotally mounted between said plates with said sector gear being integrally formed thereon adjacent an end thereof, said adjustable tail plate being anchored to said arbor with one end of said tail plate being offset to engage an edge of said sector gear and provide a stop and the other end being connectable to the pressure responsive element of the gauge.

6. In a movement as claimed in claim 5 with said other end of said tail being bendable to adjust the range of pointer movement during calibration of the gauge.

7. In a movement as claimed in claim [1] *10* with said one column comprising a first column portion on said bottom plate with the end of said column portion having a longitudinally extending pin, a mating second column portion on said top plate and having a slot across its end to receive one end of said hairspring, and a hole to receive the longitudinal pin, the other end of said hairspring passing through said second column portion slot, said first column being provided with a shoulder which will trap said hairspring upon assembly of the two movement plates.

8. The movement as claimed in claim 1 with said pinion shaft and said arbor having reduced projections on at least one of the ends thereof bearing against end walls in said plates and providing reduced bearing areas for said shaft.

9. The movement in claim 1 with a pointer mounted on said pinion shaft, therein being a recess between said shaft and pointer for receiving a holding cement and fixedly anchoring said pointer thereon.

*10. The movement as claimed in claim 1 wherein said columns comprise a plurality of mating integral male and female plastic telescoping columns with said other end of the hairspring trapped by one of said telescoping male and female columns.*

*11. The movement as claimed in Claim 1 wherein said*

*columns comprise a plurality of mating integral male and female plastic telescoping columns.*

References Cited

The following references, cited by the Examiner, are of record in the patented file of this patent or the original patent.

UNITED STATES PATENTS

| | | | |
|---|---|---|---|
| 3,398,583 | 8/1968 | Heise et al. | 73—41 X |
| 2,227,514 | 1/1941 | Seegers | 73—415 |
| 2,344,882 | 3/1944 | Kahn | 73—415 |
| 3,020,702 | 2/1962 | Feldman | 58—52 R |
| 2,294,869 | 9/1942 | Buechmann | 73—411 |
| 2,312,716 | 3/1943 | Hopkins | 73—411 X |
| 2,406,098 | 8/1946 | Musgrave et al. | 74—89.19 |
| 3,293,917 | 12/1966 | Vander Heyden | 73—431 X |

FOREIGN PATENTS

| | | | |
|---|---|---|---|
| 374,218 | 6/1932 | Great Britain | 73—432 A |

OTHER REFERENCES

Publication, "Nylon in Bearings & Gears," by W. C. Wall, Product Engineering. July 1950, pp. 102–107, TJ1P93.

RICHARD C. QUEISSER, Primary Examiner

D. M. YASICH, Assistant Examiner